(12) United States Patent
Sayers et al.

(10) Patent No.: US 10,367,794 B2
(45) Date of Patent: Jul. 30, 2019

(54) METHOD AND APPARATUS FOR SECURING A SENSOR OR DEVICE

(71) Applicants: Ian L Sayers, South Shields (GB); Paul J Long, San Francisco, CA (US)

(72) Inventors: Ian L Sayers, South Shields (GB); Paul J Long, San Francisco, CA (US)

(*) Notice: Subject to any disclaimer, the term of this patent is extended or adjusted under 35 U.S.C. 154(b) by 0 days.

(21) Appl. No.: 15/494,993

(22) Filed: Apr. 24, 2017

(65) Prior Publication Data

US 2019/0081936 A1    Mar. 14, 2019

Related U.S. Application Data

(60) Provisional application No. 62/333,123, filed on May 6, 2016.

(51) Int. Cl.

| | |
|---|---|
| H04L 29/06 | (2006.01) |
| H04W 60/00 | (2009.01) |
| H04L 9/08 | (2006.01) |
| H04W 12/04 | (2009.01) |
| H04W 4/80 | (2018.01) |
| H04W 12/08 | (2009.01) |
| H04W 4/70 | (2018.01) |
| H04W 84/18 | (2009.01) |

(52) U.S. Cl.
CPC .......... *H04L 63/061* (2013.01); *H04L 9/0819* (2013.01); *H04W 4/70* (2018.02); *H04W 4/80* (2018.02); *H04W 12/04* (2013.01); *H04W 12/08* (2013.01); *H04W 60/005* (2013.01); *H04W 84/18* (2013.01)

(58) Field of Classification Search
CPC ...... H04L 63/061; H04L 9/0819; H04W 4/80; H04W 12/04; H04W 12/08; H04W 84/18

USPC ........................................................... 726/3
See application file for complete search history.

(56) References Cited

U.S. PATENT DOCUMENTS

| | | | | |
|---|---|---|---|---|
| 2003/0147536 | A1* | 8/2003 | Andivahis | ............... H04L 63/06 380/277 |
| 2009/0070580 | A1* | 3/2009 | Cobelo | ............... G06F 21/6209 713/165 |
| 2009/0300740 | A1* | 12/2009 | Verma | ................... H04L 63/062 726/6 |
| 2014/0344568 | A1* | 11/2014 | Yang | .................... H04L 63/126 713/162 |

(Continued)

OTHER PUBLICATIONS

Beallieu et al., "The Simon and Speck Families of Lightweight Block Ciphers", NSA, pp. 1-42 (Year: 2013).*

*Primary Examiner* — Michael S McNally (57) ABSTRACT

One embodiment of this invention describes a method and apparatus for the secure identification and validation of low complexity sensors or devices on a network. In addition any data transmitted between the sensors/devices to/from the network is secured by means of encryption techniques. The method as described herein is intended to protect and secure sensors/devices that might transmit limited amounts of data and have reduced levels of onboard processing power. However it could easily be adapted to other types of networks to provide comparable levels of security and protection.

A further understanding of the nature and the advantages of the particular embodiments disclosed herein may be realized by referencing the remaining portions to the specification and the attached drawings.

21 Claims, 5 Drawing Sheets

(56) References Cited

U.S. PATENT DOCUMENTS

| | | | |
|---|---|---|---|
| 2015/0270956 A1* | 9/2015 | Basmov | G06F 21/602 |
| | | | 713/189 |
| 2016/0006563 A1* | 1/2016 | Koike | H04L 9/302 |
| | | | 713/168 |
| 2016/0212147 A1* | 7/2016 | Palin | H04L 63/062 |
| 2016/0259855 A1* | 9/2016 | Jwa | G06F 16/951 |
| 2017/0039833 A1* | 2/2017 | Baczuk | G08B 21/0211 |
| 2017/0272412 A1* | 9/2017 | Rose | H04L 63/0492 |
| 2017/0323087 A1* | 11/2017 | Kline | G06F 21/44 |
| 2017/0347224 A1* | 11/2017 | Robba | H04W 4/70 |

* cited by examiner

Fig 2: Overall System Architecture

Fig 4: Message flow for a Controlling Sensor

METHOD AND APPARATUS FOR SECURING A SENSOR OR DEVICE

CROSS REFERENCE TO RELATED APPLICATIONS

This application claims priority to U.S. Provisional Application Ser. No. 62/333,123 filed on May. 6, 2016, entitled "Method and apparatus for securing a sensor or device", which is hereby fully incorporated by reference.

BACKGROUND TO INVENTION

One embodiment of this invention describes a method and apparatus for the secure identification and validation of sensors or devices (e.g. Temperature Sensors or Alarm Controllers) in a machine-to-machine communications network. In addition as part of this invention any data transmitted between the sensors/devices to/from the network is secured by means of encryption techniques.

As the all-pervasive Internet begins to adopt inter-communications between low complexity devices there is a critical need to protect these devices from the types of security breaches found in their more complex cousins. The security of the low complexity devices, e.g. Internet of Things (IOT) sensors or devices, is paramount in gaining the confidence of the end users and thereby the wide acceptance of such sensors or devices in a world now familiar with credit card hacks, personal data theft and compromised email servers. The current set of available security solutions are predicated on communications between complex and powerful devices with substantial processing capabilities and almost limitless power. A majority of these contemporary solutions use convoluted encryption or validation schemes that necessitate the sending of large amounts of data between the devices in order to provide the desired level of protection. However these convoluted security schemes also, in general, require large processing engines (e.g. Intel CPUs), large power supplies and high bandwidth connections. As a consequence if they were to be implemented in low complexity sensor/devices to provide security it would completely negate any benefits to be gained by such sensor/devices and seriously curtail their rapid introduction to the market.

It is an important key characteristic of the low complexity sensors/devices that they have very little processing power (i.e. low performance CPUs) and in some cases may have no processing capability at all. Added to this limitation is the likelihood that these sensors/devices will also have very limited power available, either from a small battery or in some cases via the use of energy harvesting techniques. Furthermore the low complexity sensor/device family usually only perform one or perhaps a few dedicated tasks and cannot be used to run other applications.

There are a number of encryption and validation schemes that are currently used by the mobile and fixed network community. Perhaps the best and most studied mobile scheme is that used by GSM networks [1], in development since 1989. The GSM network security relies on the exchange of multiple pieces of authentication data transmitted over the radio interface and sourced from a Subscriber Identity Module (SIM) embedded in the Mobile Station (MS) (e.g. Smartphone). There are multiple layer 3 messages required to authenticate the Mobile User, ignoring the underlying protocol to transfer those messages to and from the fixed radio network. The use of multiple messages to validate/authenticate a user is acceptable when failure to do so might cost the network operator considerable revenue due fraudulent accesses. Almost as a by-product of the authentication process a shared encryption key is generated independently in the MS and network that allows the encryption of data sent on the radio interface. This radio interface encryption protects the mobile user from eavesdropping and secures the transmitted data. Using multiple messages to establish the validity of the user and generate an encryption key is acceptable when the processing capabilities of the mobile device and the power source available (i.e. large rechargeable battery) are also required to perform other tasks required of a modern Smartphone, this is in complete contrast to low complexity devices. The detailed protocols, procedures and methods used by GSM based networks are proprietary and unique to the network; they are also very hard to incorporate into low complexity devices. Although the overall methods used in GSM networks are generally accepted as "good practice" for securing a mobile network.

More recently (circa 2001) [2] methods have been devised for breaking the security of a GSM network and thereby hacking into voice and data calls. One particular method relies on sniffing thousands of packets on the radio interface and deriving the original key used to encrypt the packets thereby making future packets easily readable. There are straightforward fixes to deal with these breaches but even the most secure network can eventually be compromised if the volume of encrypted data is sufficiently large.

As can be seen by anyone skilled in the art the use of a heavyweight protocol like that used in GSM, although secure, would require considerable CPU processing power in the device as well as significant electrical power neither of which would be available in a low complexity sensor/device as addressed in this patent.

An alternative security scheme nominally directed towards low complexity devices is used by networks such as the Low Power Wide Area Network LoRaWAN™ [3] supported by the LoRa Alliance. However the scheme chosen by the LoRa Alliance relies on a set of pre-stored keys in the end nodes and the use of AES-128 encryption. Although each end device has unique keys in order to operate, that key must be shared either over the air with the network to which it attaches or via personalization at production time. LoRa relies on mutual authentication between end devices by exchanging multiple messages in order to verify keys. As the key is potentially sent over the radio interface it is possible that it might be captured by a man in the middle attack and used to hack the node from which it was sent or it could be captured by the network to which it is sent if that network itself is not secure. Alternatively it might be possible to duplicate the node and produce multiple false inputs to a database thereby destroying the integrity of any data that has been collected. The scheme chosen by the LoRa Alliance appears to be quite vulnerable to attack [4] and easily compromised. Further the data exchanges uses JavaScript Object Notation (JSON) data encoding which might provide opportunities for hackers to break even the AES-128 encryption as the data stream will be very consistent from packet to packet, especially if the low complexity sensor/device is a simple temperature sensor. Added to this weak security the sensor/device is required to generate quite a substantial amount of "unnecessary" data that has to be transmitted on the radio interface necessitating the use of even more energy. The fact that the over the air encryption scheme requires multiple messages to establish authenticity and start the encryption process could reduce the battery life of a low complexity sensor/device. Furthermore the sensor/device has to support IP type addressing including the required JSON data encoding inflates the size of the data packet that has to be sent on the radio interface once again requiring evermore energy.

Although there are many well-known network protocols such as SSH, SHA, SSL etc. that might be usable by a low complexity sensor/device these protocols are also vulnerable to attack as has been shown by numerous research articles [5, 6, and 7]. Even though these protocols are well known and understood they too present very heavy processing requirements to the underlying hardware a requirement that is not tenable when applied to a low complexity sensor/device.

In order to provide the level of security demanded by the end users and the network operator this patent presents a unique invention that addresses the dual problems of security complexity and power requirements. It is assumed that a low complexity sensor/device only has a small volume of data to send during each transmission interval. For example a temperature sensor may only have 1 or 2-bytes of data to send. Therefore adding in IP addresses or JSON encoding would be an unnecessary addition to the radio payload. The NSA approved SIMON and SPECK families of lightweight block ciphers [8] can securely encode 128-bits of data using the minimum of processing resources while providing the same level of security as the AES-128/256 schemes [8]. It is possible to perform the SIMON and SPECK encryption/decryption in either hardware or software further reducing the design restrictions on the target sensor/device.

The scheme outlined in this embodiment uses pre-shared random keys that are generated during manufacture of the sensor/device so there is no need to send them on an open radio interface, further reducing the ability for a hacker to hack the network. Each sensor/device has a unique set of keys. As an additional safeguard the pre-shared keys can be reformed each time a key is used if the low complexity sensor/device has the ability to dynamically change memory and is able to receive transmissions. This feature is also unique to the invention and provides an extra level of security.

A further understanding of the nature and the advantages of particular embodiments disclosed herein may be realized by reference to the remaining portions of the patent description and the attached drawings.

REFERENCES 1. http://www.uky.edu/~jclark/mas355/GSM.PDF
2. http://www.rtl-sdr.com/hacking-gsm-signals-with-an-rtl-sdr-and-topguw/
3. https://www.lora-alliance.org/What-Is-LoRa/Technology
4. Robert Miller, MWR Labs Whitepaper LoRa Security Building a Secure LoRa Solution, 22 Mar. 2016. https://labs.mwrinfosecurity.com/publications/lo/
5. https://www.androidheadlines.com/2017/02/google-security-crew-finds-a-hole-in-sha-1-encryption.html.
6. http://www.spiegel.de/international/germany/inside-the-nsa-s-war-on-internet-security-a-1010361.html
7. http://www.darkreading.com/attacks-breaches/ssl-drowns-in-yet-another-serious-security-flaw/d/d-id/1324521.
8. Beaulieu et al., "The SIMON and SPECK families of lightweight block ciphers", National Security Agency, 19 Jun. 2013
9. Bardis et al., True Random Number Generation Based on Environmental Noise Measurements for Military Applications, ISPRA'09 Proceedings of the 8th WSEAS International Conference on SIGNAL PROCESSING, ROBOTICS and AUTOMATION, pp68-73, Feb. 21-23, 2009, ISBN: 978-960-474-054-3.
10. Atmel™ 8-bit AVR Microcontroller ATmega328PB complete datasheet, Atmel-42397C-8-bit AVR-ATmega328PB_Datasheet_Complete-10/2015.

BRIEF DESCRIPTION OF THE DRAWINGS

One embodiment of this invention and its advantages may be described with reference to the associated figures.

DETAILED DESCRIPTION OF EMBODIMENTS

One embodiment of this invention describes a method and apparatus for the secure identification and validation of low complexity sensors or devices on a network. In addition any data transmitted between the sensors/devices to/from the network is secured by means of encryption techniques. In the network described herein the remote sensors/devices typically send and receive data infrequently. The data sent by the sensor/device typically contains a limited number of bits of information. This type of information flow might be found in an Internet of Things (IOT) network architecture, for example, Smart Grid Home Area Networks (HAN), Smart Grid Home Energy Management System (HEMS), Smart Grid Enterprise Networks, Smart Home Networks, Medical patient sensor systems, Automotive networks, and Health/Biometric sensor systems. However this should not restrict the applicability of any potential embodiment of this invention as described in this patent.

The methods described in one embodiment of this invention are capable of supporting billions of sensors/devices in an efficient and cost effective manner. As IOT and similar sensor/device networks become more pervasive, the need to reliably verify and log the identity of sensors/devices, as well as to securely transport the data they transmit from the source to destination becomes paramount. Not only is it important to securely transport the data such that the information remains unaltered by $3^{rd}$ parties, the network and sensor/device also need to authenticate each other to prevent interception of the data by $3^{rd}$ parties. One embodiment of this invention presents such a method that can be used to protect networks efficiently and cost-effectively so that all network types can be protected.

The Overall System Architecture (FIG. 2) considers implementation of two types of sensors/devices 200: the reporter and the controller. The reporter sensor/device normally transmits information to the network and typically does not receive data from the network although it is possible that it may receive data in other embodiments of this invention. In one possible embodiment of the controller sensor/device, it can receive command data information from the Secure Database Storage 203 and/or the Secure Site 209 and act upon the received command data to perform local functions (e.g. turn on an alarm buzzer). In addition the controller sensor/device can also send command data or information (FIG. 4) 403 to the IOT Access Node (IAN) 405

Figure 4:
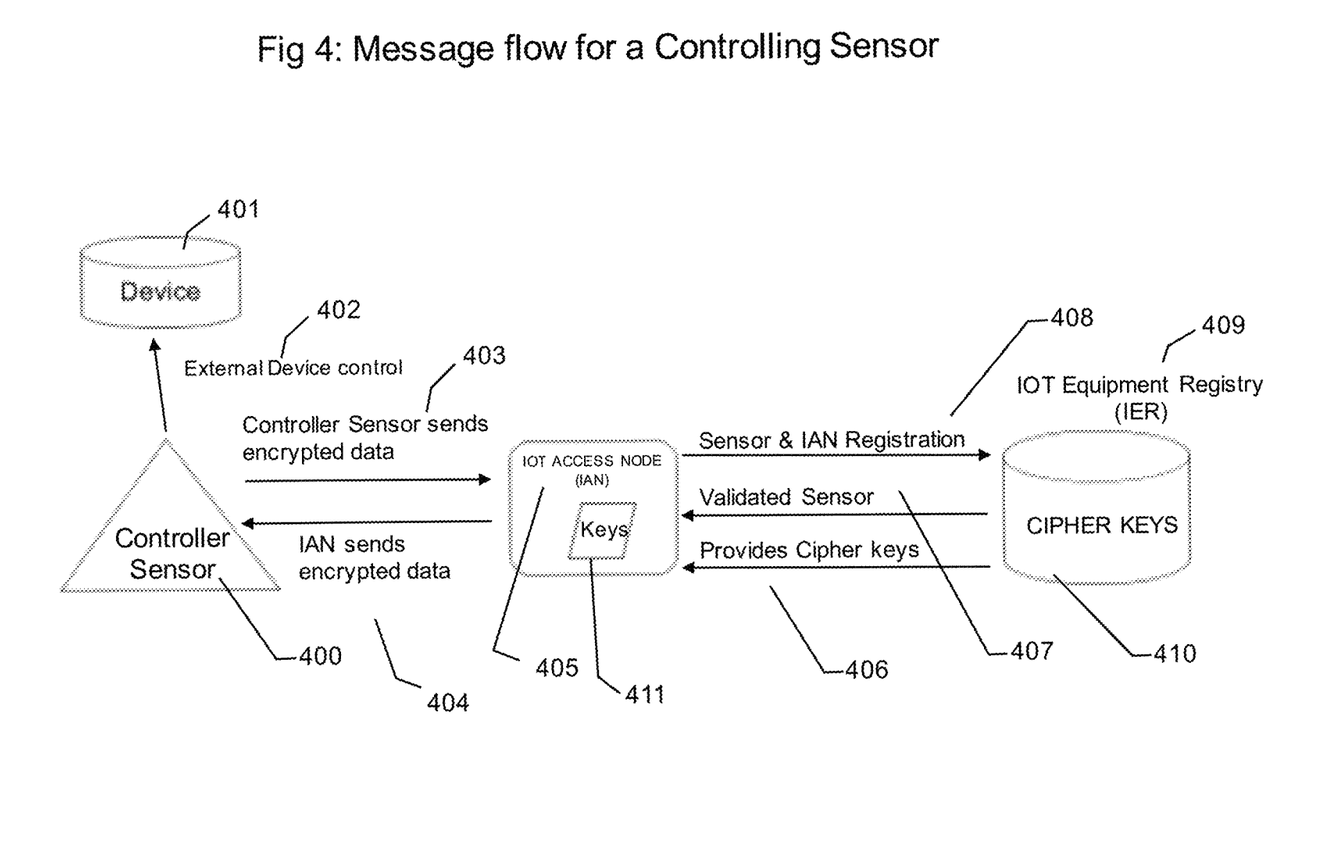
FIG. 4. Typical message flow for a controller type sensor.

(it is not clear whether the network refers to Controller Sensor 400 or the act of sending encrypted data by the Controller Sensor 403). Both types of sensor/device transmit at intervals determined during the manufacturing process. The transmissions can typically be time based, application/data based or condition threshold based. Other transmissions schemes are possible and can be envisioned in other embodiments of this invention.

In one embodiment of this invention it is assumed that the sensor/devices typically transmit small data packets for example 16-bytes (128-bits) of data at very infrequent intervals. In another embodiment of this invention there are no restrictions on the size of the data packet and other sizes could be implemented. As the total energy available to the sensor/device is typically limited the intent of the security scheme described in this patent is to reduce the total amount of energy used in order to maximize the life of the sensor/device power source while protecting the sensitive network data. The power source might be for example a primary cell, rechargeable battery or an energy-harvesting device including but not limited to solar cells, piezo motion generators, atomic battery or fuel cell.

In one embodiment of the invention there are two main parts to the security framework (FIG. 2, FIG. 3): one part of this framework in one possible embodiment of this invention is the IOT Access Node (IAN) 201, 302, 405, 505 and the other is the IOT Equipment Registry (IER) 204, 307 database.

Figure 2:
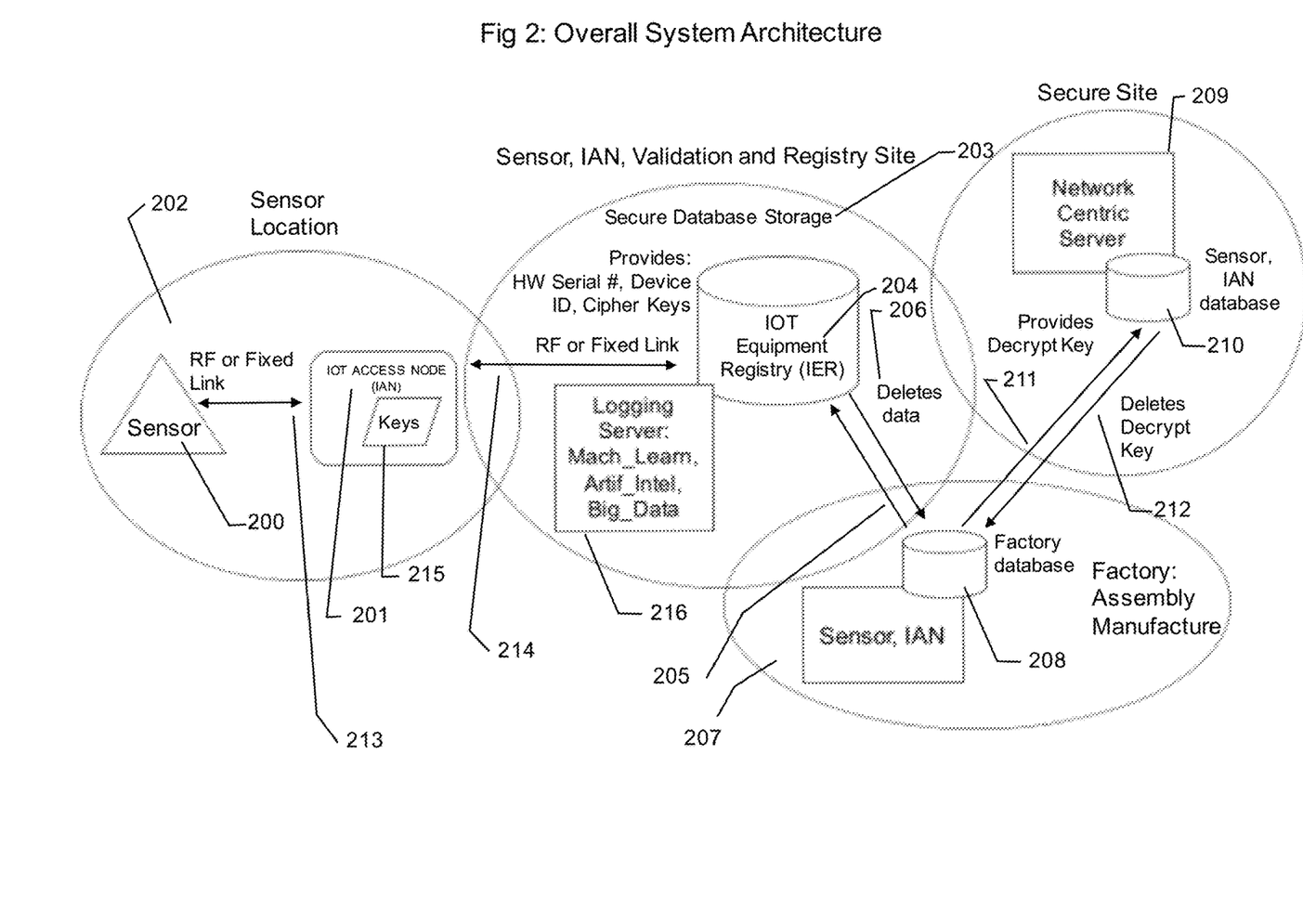
FIG. 2. Illustrates the overall System Architecture showing the network architecture and all nodes associated with one embodiment of this invention.
Figure 3:
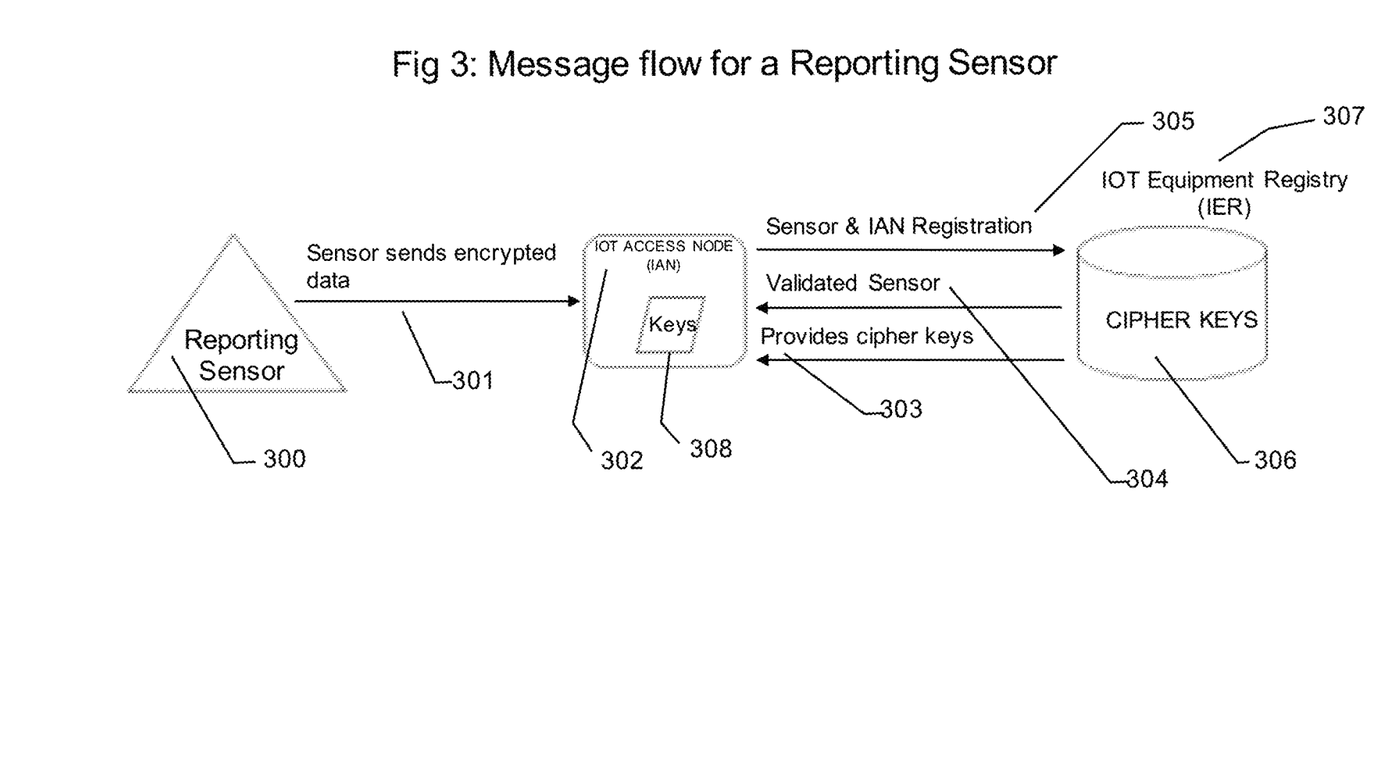
FIG. 3. Typical message flow for a reporting type sensor.
Figure 5:
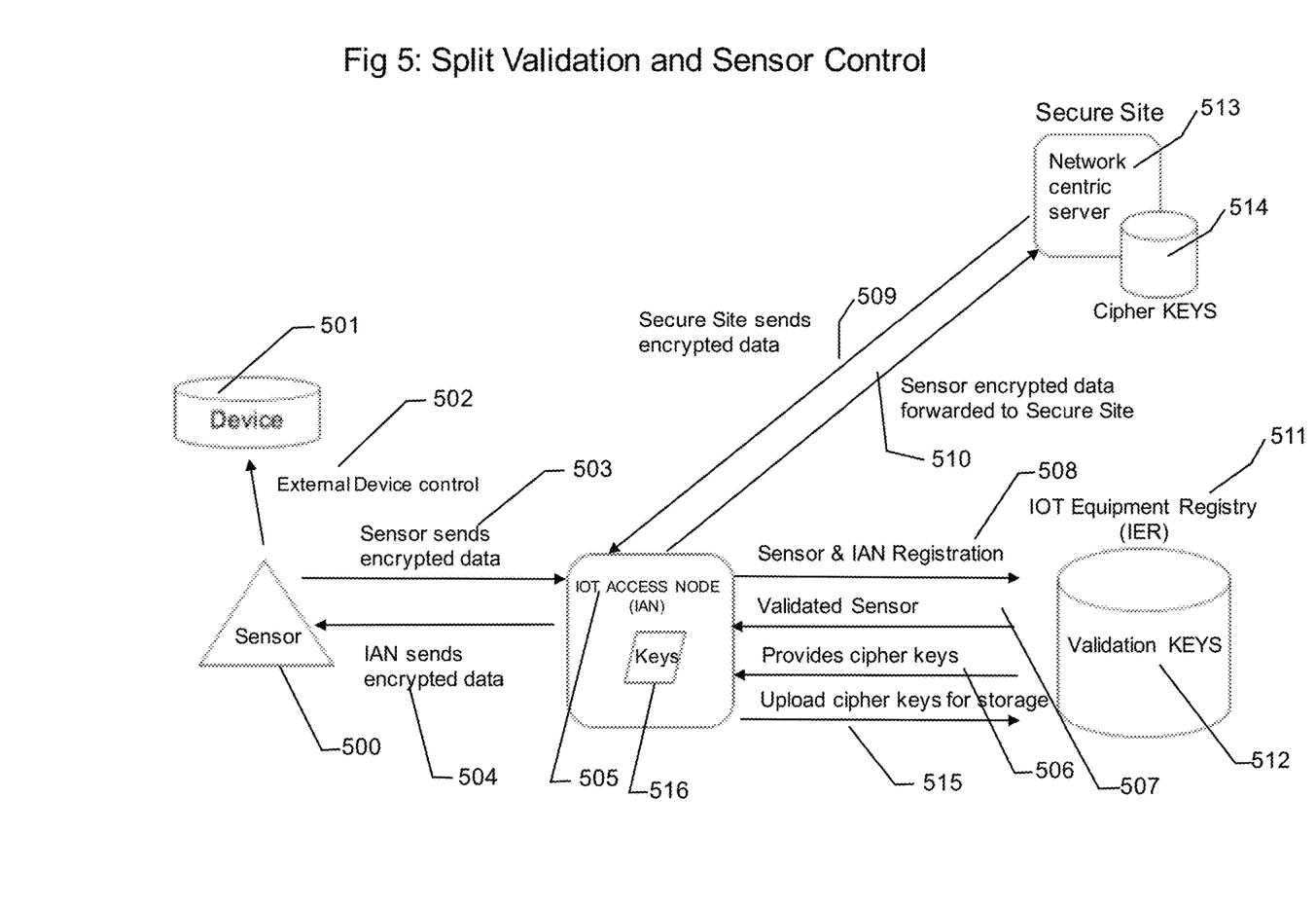
FIG. 5. Illustrative methods for authentication/validation and decryption using a split message flow.

The IOT Access Node (IAN) 201 supports the radio link (or fixed wire link) 213, 214 to the sensor/device 200, 302. In addition the IOT Access Node (IAN) typically performs the following functions, although other functions might also be performed in other embodiments of this invention:
Encrypts and decrypts data transfers from and to the sensor/device 200, 302;
Encrypts and decrypts data transfers with the IOT Equipment Registry (IER) 204, 511 database;
Validates secure access to and from the sensors/devices 200, 302;
Validates secure access to the IOT Equipment Registry (IER) 204, 511 database;
Internal storage of cipher keys for its own use;
Embedded security processor to securely encrypt and decrypt packets in such a way that a $3^{rd}$ party is unable to determine the internal functions without physically destroying the processor.
Storage of sensor/device cipher keys in an internal database.

In one embodiment of this invention, the second part of this framework is the IOT Equipment Registry (IER) 204, 511 database which may store cipher keys 215, 306, 308, 410, 411, 512, 516 that are generated during the manufacture or assembly (e.g. at Factory 207) of any or all of the devices associated with the network. The IOT Equipment Registry (IER) 204, 306, 410, 511 database provides a central repository for the security data associated with the sensor/device 200, 300, 400, 500 and IOT Access Node (IAN) 201, 302, 405, 505.

In one embodiment of this invention a Network Centric Server 513 may also be available in the sensor/device network. The Network Centric Server provides similar or additional services to the IOT Access Node (IAN) 201, 302, 405, 505. The Network Centric Server 513 allows a network operator to offer security services such as cipher keys 514 without the need for an IOT Access Node (IAN) 201, 302, for example at locations that might be remote or otherwise difficult access.

Figure 1:
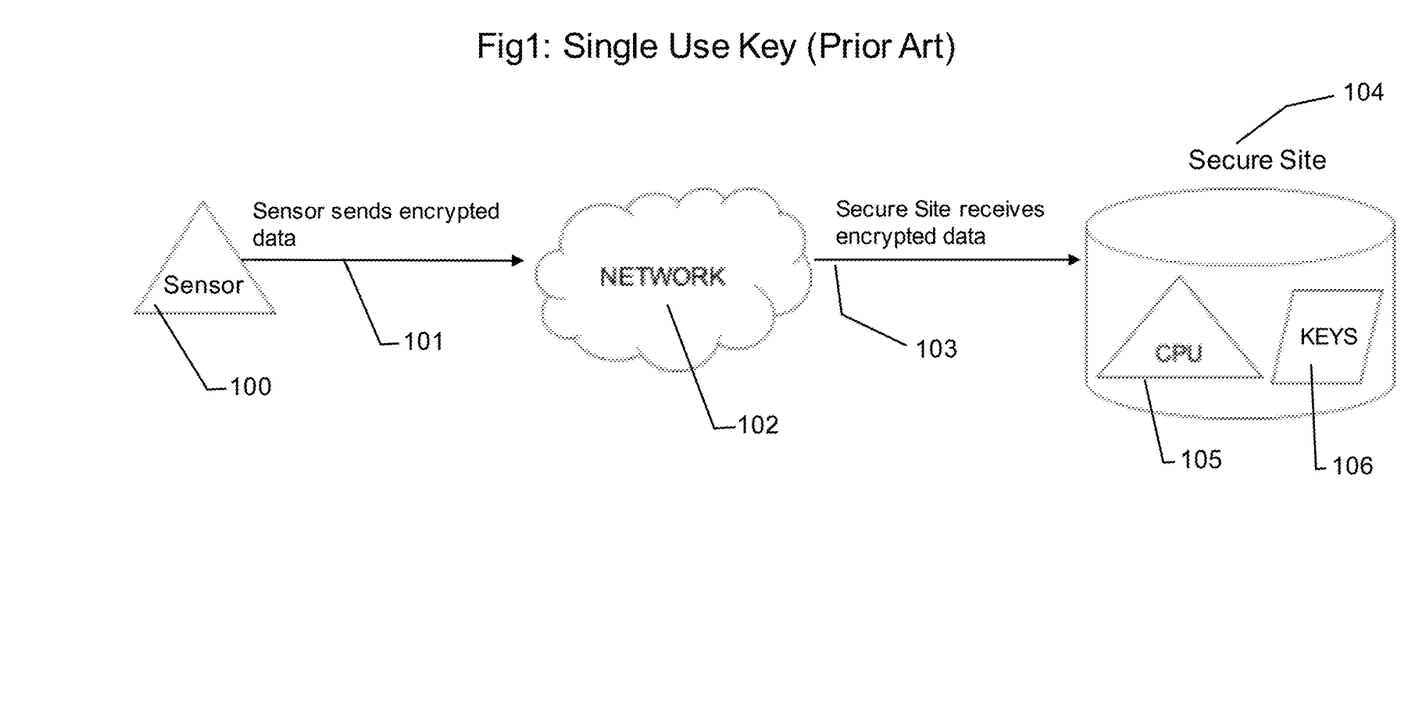
FIG. 1. (Prior art) Example of a Single Use Key security system.

In one embodiment of this invention the security scheme is based on the well-documented intrinsic protection provided by a single use cipher key (FIG. 1) 106. A single use cipher key is only used to encrypt/decrypt one transmission 101,103 and never re-used. However there are certain inherent problems in using such a scheme in a sensor/device network:
  It is impossible to pre-load a sensor/device with a lifetime's supply of cipher keys. This would be impractical primarily due the memory limitations of such low complexity sensors/devices 100 and the possible security risk should the stored cipher key table be compromised at some future date rendering the network insecure.
  The lifetime of such sensors/devices 100 might be measured in multiple years, in some cases up to 20 years.
  Both sides of the link 100, 104 need to access the contents of the stored cipher key table 106 and be able to use that table as required to encrypt and decrypt messages.
  Both sides need to be updated with new stored cipher keys 106 as they are consumed in the communications process.

In one embodiment of the invention it is assumed that the sensor/device 200, 300, 400, 500 does have the ability to store a certain limited number of cipher keys internally and alter any bit position within the cipher key table when commanded to do so by a controlling external sensor/device 201, 204 210 e.g. IOT Equipment Registry (IER) database or IOT Access Node (IAN). Most modern embedded microcontrollers have internal flash memory that can be rewritten a limited number of times. They may also have unique serial numbers permanently written into their memory during the chip fabrication process.

In one embodiment of the invention during assembly of the sensor/device 200, 300, 400, 500, the Factory 207 may securely place up to n×32 or 64 or 128-bit unique cipher keys into the processors flash memory along with a unique secure serialized identity, for example the serial number as used in the Atmel™ series of embedded sensors/devices [10]. In addition the sensor/device 200, 300, 400, 500 may have a visible unique serialized identity that a user can use to associate the sensor/device with an IOT Access Node (IAN) 201, 302, 405, 505. The Factory can securely deliver the cipher keys, unique serialized number and other sensor/device data to the IOT Equipment Registry (IER) 204, 306, 410, 511 database. The data may then be stored securely in the IOT Equipment Registry (IER) 204, 306, 410, 511 database indexed with the secure identity, visible unique serialized identity and cipher key table. The IOT Equipment Registry (IER) 204, 306, 410, 511 database may also register the identity of the IOT Access Node (IAN) 201, 302, 405, 505 associated with a particular sensor/device to prevent the sensor/device 200, 300, 400, 500 being taken over by other $3^{rd}$ parties. The number of cipher keys used is by way of an illustrative example and other derivative schemes could be considered while still adhering to the same method in future alternative embodiments of this invention.

In one embodiment of this invention the IOT Access Node (IAN) 201, 302, 405, 505 typically has a similar unique secure serialized number, unique visible serialized identity and several internal cipher keys, however the ability for the IOT Access Node (IAN) 201, 302, 405, 505 to communicate on a potentially broadband network means that alternative methods could be used to authenticate the IOT Access Node (IAN) 201, 302, 405, 505 and its permission to access the network. Before an IOT Access Node (IAN) 201, 302, 405, 505 can communicate with the network it needs to be authenticated with the IOT Equipment Registry (IER) 204, 306, 410, 511 database as a genuine IOT Access Node (IAN) 201, 302 and similarly the IOT Access Node (IAN) 201, 302, 405, 505 needs to authenticate the IOT Equipment Registry (IER) 204, 306, 410, 511 determine to determine if it is genuine. For example the IOT Access Node (IAN) 201, 302, 405, 505 could encrypt the Sensor 200, 300, 400, 500 identify with its own keys to hide the sensor 200, 300, 400, 500 identity and thereby continually validate the IOT Access Node (IAN) 201, 302, 405, 505. The method outlined below for the sensor/device 200, 300, 400, 500 could also be used with the IOT Access Node (IAN) 201, 302, 405, 505 in this embodiment of the invention.

In one embodiment of this invention the secure internal serialized number and user visible serialized number 205 should not normally be related in any way nor should they be the same. Similarly the cipher keys 205, 512 should not typically bear any resemblance to or be derived from either of the serialized numbers. The cipher keys 205, 514 generated from the Factory 207 during manufacture should preferably be created using a random number generator that employs environmental noise [9] (e.g. from unstable electronic components) rather than shift registers or other deterministic means. This will help prevent sequences of cipher keys 205, 512 that might be compromised should one cipher key 205, 512 be uncovered.

In one embodiment of this invention an alternative to the serialized number could be to use a hash algorithm (e.g. MD5) computed across the data stored in the internal flash memory. If a $3^{rd}$ party user changes the internal processor code in anyway to attack the sensor/device, then the MD5 hash would be different, therefore the sensor/device check would then fail when sent to the network. The MD5 hash could also incorporate the stored cipher keys, which are unique on each sensor/device, making the MD5 hash different for each sensor/device and similar to a digital fingerprint.

Securing the IOT Access Node (IAN)

In one embodiment of the invention when the IOT Access Node (IAN) 201, 302, 405, 505 first accesses the network, the onboard security processor should provide the IOT Access Node (IAN) 201, 302, 405, 505 main processor with a registration message packet pre-encrypted. This packet should be encrypted with a randomly selected cipher key from the cipher keys stored in the IOT Access Node (IAN)'s 201, 302, 405, 505 security processor. The packet may typically contain one or more of the following: a timestamp, random number, CRC, a sequence number, secure serialized identity/MD5 hash of the flash memory contents. The packet is forwarded to the IOT Equipment Registry (IER) 204, 306, 410, 511 database with the IOT Access Node (IAN) 201, 302, 405, 505 unique visible serialized identity added to the data packet in clear text 508. The IOT Equipment Registry (IER) 204, 306, 410, 511 database will attempt to decode the IOT Access Node (IAN) 201, 302, 405, 505 registration packet with all the cipher keys 512 available for the identified IOT Access Node (IAN) 201, 302, 405, 505. If the decryption succeeds then the IOT Equipment Registry (IER) 204, 511 database will check the contents are valid, if so then the packet has been successfully deciphered. A successfully deciphered message will indicate that the IOT Access Node (IAN) 201, 302, 405, 505 is genuine. The IOT Equipment Registry (IER) 204, 511 database will then send an acknowledgement response with a cipher key 205, 512 from the set that is typically a fixed/known offset from the cipher key used to encrypt the register message 506. The register acknowledgement packet may contain for example a time stamp, random number, sequence number, CRC or commands to activate the radio of the IOT Access Node (IAN) 201, 302, 405, 505.

In one embodiment of this invention if upon receipt of the register acknowledgement it is successfully deciphered using the offset cipher key stored during manufacture then the IOT Access Node (IAN) 201, 302, 405, 505 security processor will enable the radio access. In this case it has also determined that the IOT Equipment Registry (IER) 204, 306, 410, 511 database is genuine.

In one embodiment of this invention the random number in the register message and register acknowledgement message may be used to modify the cipher key 512 used in the respective registration transactions. However the modification will typically not happen at the IOT Equipment Registry (IER) 204, 306, 410, 511 database until it receives another valid transmission from the IOT Access Node (IAN) 201, 302, 405, 505 during the ongoing updating process. Using this method of changing the stored cipher key 512 reduces the burden on the network link as well as the energy required to transmit the data to the IOT Equipment Registry (IER) 204, 306, 410, 511 database. The IOT Access Node (IAN) 201, 302, 405, 505 may also be using limited power resources e.g. solar power.

First Network Access by Sensor/Device

In one embodiment of the invention when a sensor/device 200, 300, 400 powers up for the very first time whether it is a reporting or controller type of sensor/device 200, 300, 400 it will typically access the network in the same manner. The sensor/device 200, 300, 400 will encrypt and send a registration packet 301, 403, 503 with (for example) the n-1th cipher key from the internal cipher key table to the IOT Access Node (IAN). The encrypted data may include the secure serialized number/MD5 hash of flash, a random number, cipher key offset, CRC check digits, sequence number and any other pertinent information. The encrypted packet may include the clear text user visible serialized identity. As this is the first time the IOT Access Node (IAN) 201, 302, 405, 505 has seen the sensor/device based on the visible identity it will immediately forward the received packet on to the IOT Equipment Registry (IER) 204, 306, 410, 511 database. It is assumed that the IOT Access Node (IAN) 201, 302, 405, 505 has been validated with the IOT Equipment Registry (IER) 204, 306, 410, 511 database prior to the sensor/device 200, 300, 400, 500 remote access (see previous section). It is further assumed that the IOT Access Node (IAN) has a registration entry for the user visible identity. If no such registration exists the packet will be dropped and not forwarded, as any registration will fail. The IOT Access Node (IAN) 201, 301, 405, 505 will temporarily log the receipt of the user visible identity of the sensor/device 200, 300, 400, 500 in an internal secure table e.g. internal to the onboard security processor. The IOT Access Node (IAN) 201, 301, 405, 505 may also encrypt part or all of the received registration packet with its own cipher keys 215, 308, 411, 516 or use some other enciphering technique. In this case the IOT Equipment Registry (IER) 204, 306, 410, 511 database and IOT Access Node (IAN) 201, 301, 405, 505 would store the public keys of each entity. Other possible embodiments of this process are possible while adhering to the original intent.

In one embodiment of the invention the IOT Equipment Registry (IER) 204, 306, 410, 511 database upon receiving the registration packet from the sensor/device 200, 300, 400, 500 will use the n-1th stored cipher key to decipher the packet. If the decryption fails then the failure can be logged and the IOT Access Node (IAN) 200, 300, 400, 500 commanded to forget the data. If the decoding is successful the CRC will then be checked to confirm the packet integrity, subsequently the secure serialized number/MD5 hash will then be checked. Other data from the packet may also be checked to confirm the validity off the received packet. If these pass then the sensor/device will be considered genuine. As an additional safeguard the internal message could also be encrypted with another shared cipher key. The IOT Equipment Registry (IER) 204, 306, 410, 511 database will now securely provide the n-cipher keys generated during manufacture of the sensor/device to the IOT Access Node (IAN) security processor 506 to be used when communicating with the sensor/device. The IOT Access Node (IAN) 201, 301, 405, 505 will store all the cipher keys in a secure manner.

In one embodiment of the invention the IOT Equipment Registry (IER) 204, 306, 410, 511 database may have been preconfigured to expect the sensor/device 200, 300, 400, 500 to communicate from one identified IOT Access Node (IAN) 201, 301, 405, 505. If the IOT Access Node (IAN) 201, 301, 405, 505 sending the data from the sensor/device 200, 300, 400, 500 is not the expected one then the packet may be dropped or ignored and a log generated of a possible security issue.

In one embodiment of the invention, if the sensor/device 200, 300, 400, 500 has receiving capabilities the IOT Equipment Registry (IER) 204, 306, 410, 511 database may then send a registration acknowledgement packet to the sensor/device 200, 300, 400, 500 that typically includes its secure serialized number, the random number provided, sequence number, CRC field and a cipher key change request with, for example 16-bits of new cipher key data and an offset 507. The data will typically be encrypted with the nth cipher key. Upon successful receipt of the packet the sensor/device 200, 300, 400, 500 will decipher the packet. If successful it will now assume it is allowed to use the network. It may replace the location indicated in the nth cipher key with the provided 16-bit cipher key update and also update the n-1th cipher key with the random number it provided originally. The IOT Equipment Registry (IER) 204, 306, 410, 511 database will perform the same actions to its cipher keys. Both the nth and n-1th cipher keys will have been updated with new data. The indicated offsets can be random in nature. Other possible implementations are possible to perform the internal cipher key updates.

There are several failure conditions in the registration access that need to be addressed.

In one embodiment of this invention if the IOT Equipment Registry (IER) 204, 306, 410, 511 database for some reason does not respond within the regular update interval of the sensor/device, the unit may try again with a new set of data in the packet, but using the same n-1th cipher key.

In one embodiment of this invention if the IOT Equipment Registry (IER) 204, 306, 410, 511 database responds with a registration packet, then it will retain the old and new cipher keys until the new registration is acknowledged by some means, for example by the first non-registration encrypted packet sent to the IOT Access Node (IAN) by the sensor/device—this will indicate that the sensor/device received the acknowledgement from the IOT Equipment Registry (IER) (see below).

In one embodiment of this invention if the IOT Equipment Registry (IER) 204, 306, 410, 511 receives a new registration packet prior to any acknowledgement it will assume the previous registration has failed and delete the new cipher key and reuse the old cipher key.

In one embodiment of this invention the next access by the sensor/device 200, 300, 400, and 500 could use a different cipher key from the stored cipher key set. In this case the process uses fresh cipher keys on each access.

In one embodiment of this invention if the registration process is successful and the sensor/device receives the register acknowledgement with cipher key updates, then it can begin communication with the network. The first sensor/device data sent to the network will contain the acknowledgement to the IOT Equipment Registry (IER) 204, 306, 410, 511 database added into the data. Once the acknowledgement has been received the IOT Equipment Registry (IER) 204, 306, 410, 511 database will update the n-1th and nth cipher keys. The IOT Access Node (IAN) 201, 301, 405, 505 security processor will forward the registration acknowledgement to the IOT Equipment Registry (IER) 204, 306, 410, 511 database.

It should be noted that in order to determine the cipher key by eavesdropping, typically more than one packet of data using the same cipher key is required. In this scheme packets are typically transmitted with different cipher keys even if the cipher keys is repeated it would be a significant amount of time before sufficient encrypted packets were available with the same cipher key. Furthermore since the cipher key could be chosen randomly each time it will be very difficult to correlate the packets using the same cipher key. In addition if the cipher keys are updated for a controlling sensor/device 400 then the cipher keys will change over the course of time so there would never be any correlation with previous data.

Sensor/Device Communication with Network.

In one embodiment of this invention when a sensor/device 200, 300, 400, 500 has something to send to the network it will typically randomly pick one of the stored cipher keys and encrypt the data to be sent (FIG. 3) 301 (FIG. 4) 403, (FIG. 5) 503. In addition to the data to be sent a random number, cipher key offset, sequence number, CRC check digits may also be included as well as an acknowledgement to any other messages sent to the sensor/device 200, 300, 400, 500 (see below). Upon receipt of the data packet from the sensor/device 200, 300, 400, 500 the IOT Access Node (IAN) 201, 301, 405, 505 security processor will use the cipher key set 303, 406, 506 provided by the IOT Equipment Registry (IER) 204, 306, 410, 511 database during registration to attempt to decipher the message. Once deciphered, the clear text will be checked for validity and if valid, passed to the IOT Access Node (IAN) 201, 301, 405, 505 processor as clear text for further processing. If the decipher fails due to none RF related issues the failure will be logged and may be forwarded to the IOT Equipment Registry (IER) 204, 306, 410, 511 database for further logging 305, 408, 508.

In one embodiment of this invention if the sensor/device 200, 300, 400, 500 is able to receive messages, the IOT Access Node (IAN) 201, 301, 405, 505 might immediately prepare an acknowledgement message that includes a cipher key update for the cipher key used to send the message and the cipher key being used to the send the acknowledgement. The cipher key used to send the acknowledgement will typically be a known offset from the cipher key used to initially encrypt the message sent to the IOT Access Node (IAN) 201, 301, 405, 505. The sensor/device 200, 300, 400, 500 will initiate any pending updates of the cipher keys after receiving the acknowledgement. The IOT Access Node (IAN) 201, 301, 405, 505 security processor will update its cipher keys 215, 308, 411, 516 when the next acknowledgement is received, until then the two cipher keys will remain valid. Once the successful acknowledgement is received the cipher keys 215, 308, 411, 516 will be updated. In extreme cases the IOT Access Node (IAN) 201, 301, 405, 505 security processor might have to use the two pending cipher keys to attempt a message decode in case the previous acknowledgement failed. In which case the IOT Access Node (IAN) 201, 301, 405, 505 security processor or sensor/device 200, 300, 400, 500 will be aware that an acknowledgement was missed and can act accordingly.

In one embodiment of this invention once a transaction between the sensor/device 200, 300, 400, 500 and IOT Access Node (IAN) 201, 301, 405, 505 security processor has successfully concluded, the cipher key data will have been changed. Over time all the cipher keys in the IOT Access Node (IAN) 201, 301, 405, 505 and sensor/device 200, 300, 400, 500 will be changed. At some point the IOT Access Node (IAN) 201, 301, 405, 505 security processor might upload the new cipher keys 515 to the IOT Equipment Registry (IER) 204, 306, 410, 511 database for storage (see below shared IOT Access Nodes (IANs)) and backup purposes. For example if an IOT Access Node (IAN) failed then the cipher keys for a sensor/device might be lost rendering it useless. With the backup the IOT Equipment Registry (IER) database can send the cipher keys to the new/replacement IOT Access Node (IAN) that will be supporting the sensor/device.

Options for Cipher Key Rotations

In the above example embodiments it has been assumed that the cipher keys are separate individual entities, each one being used atomically on the encryption of the data sent to the network. The cipher keys are modified using the random numbers sent in the packets between the IOT Access Node (IAN)<->IOT Equipment Registry (IER) database and sensor/device<->IOT Access Node (IAN). There are a few possible scenarios that might be considered, depending on the level of complexity required in the sensor/device 201, 301, 405, 505 and the flash memory available for storing the cipher key data.

In one embodiment of this invention the cipher keys could be viewed as one long digit string stored in the flash memory of the sensor/device. The cipher key is then selected as 32/64/128-bit step in that digit string. For example a random sequence of digits 4096-bits long could be stored in memory. The sensor/device encrypting data would randomly select one of the sections of the digit string to use as the cipher key to encrypt the data. This position could be indicated as a clear text offset in data packet, for example as part of the clear text visible identity. The cipher key would be modified at an offset from that starting position. The cipher key would wrap round modulo $2^n-1$ if the cipher key position were selected close to the end of the string.

In one embodiment of this invention a smaller cipher key string could be used and the sensor/device 200, 300, 400, 500 selects a random position that is not communicated to the network. The network sensor/device then uses the whole string to attempt the decryption. If the decryption was performed in hardware, then multiple decryption engines could be used simultaneously on the encrypted string to produce the clear text. This way an eavesdropper would be unaware of the position used.

In one embodiment of this invention the cipher key could be read from the program memory of the sensor/device and use the program data itself as the cipher key for data encryption. The object code bytes programmed into the sensor/device would be known during manufacturing. Any attempt to change the code or modify it would result in the cipher key sequence no longer matching the data stored in the network and consequently any deciphering attempt would fail rendering the sensor/device useless to the $3^{rd}$ party.

Other schemes could be devised based upon the ideas presented above for the rotation and modification of the cipher key. The pervious examples are illustrative only and should not restrict the invention in any way.

Sensor/Device Secure Communications with Secure Site Systems

In one embodiment of this invention in order to provide added security it may be desirable that deciphering of data is only performed at a remote Secure Site operation 209, 513 and fully secured from decryption either locally at the sensor/device location, or by the site IOT Access Node (IAN) 505. If this is required, then in one embodiment of this invention it is very easy for the IOT Access Node (IAN) 201, 301, 405, 505 to forward the sensor/device 201, 301, 405, 505 encrypted data onto the Secure Site 209, 513 by simply acting as a forwarder 510. The sensor/device 201, 301, 405, 505 data can now only be deciphered by the Secure Site 513, 209. Further security will be provided by the fact that the IOT Access Node (IAN) 201, 301, 405, 505 will not have the cipher keys required to decipher any of the sensor/device data.

Sensor/Device Using Multiple IOT Access Node (IAN)s

The nature of radio communications means that a sensor/device 200, 300, 400, 500 registered on one IOT Access Node (IAN) might be able to communicate more reliably with another IOT Access Node (IAN) 201, 301, 405, 505. In one embodiment of this invention a post sensor/device registration may be an option that allows the IOT Access Node (IAN) 201, 301, 405, 505 to forward packets from unrecognized sensors/device onto the network IOT Equipment Registry (IER) database or other network entity so they can be sent to their final destination IOT Access Node (IAN) 201, 301, 405, 505. The receiving IOT Access Node (IAN) 201, 301, 405, 505 should then recognize the packet and be able to decipher the packet and perform the required actions.

Network Logging by IOT Equipment Registry (IER)

Sensor/device networks are under frequent attack by 3rd parties and are therefore vulnerable to security breaches. Currently they lack the capability to monitor and log valid and invalid transactions. While the IOT Access Node (IAN) 201, 301, 405, 505 and the IOT Equipment Registry (IER) 204, 306, 410, 511 database will allow secure network transactions $3^{rd}$ parties will continue to attack these networks due to the perceived limitations of the sensor/device 201, 301, 405, 505.

In one embodiment of this invention the IOT Access Node (IAN) 201, 301, 405, 505 and the IOT Equipment Registry (IER) 204, 306, 410, 511 database can, in combination ensure all successful and unsuccessful network transactions are logged at the IOT Equipment Registry (IER) 204, 306, 410, 511 database location for later analysis to help resolve manufacturer equipment malfunctions, analyze network problems, and identify rogue sensors/devices or hackers. The Logging Server 216 database may be distinct and separate from the IOT Equipment Registry (IER) 204, 306, 410, 511. The Logging Server 216 database could be collocated with the IOT Equipment Registry (IER) 204, 306, 410, 511 or it could be an independent entity located elsewhere within the network architecture.

In one embodiment of this invention the IOT Access Node (IAN) 201, 301, 405, 505 and the IOT Equipment Registry (IER) 204, 306, 410, 511 database can also in combination ensure all successful and unsuccessful network management transactions are logged at the IOT Equipment Registry (IER)

204, 306, 410, 511 database location on a Logging Server 216 for later analysis to help determine network management security exposures. For example the Logging Server 216 might use Artificial Intelligence or Machine Learning techniques to recognize and analyze attacks.

In one embodiment of this invention every transaction secured by the IOT Access Node (IAN) 201, 301, 405, 505 and the IOT Equipment Registry (IER) 204, 306, 410, 511 database may be easily traceable. One embodiment of this invention ensures that any sensor/device 201, 301, 405, 505 or IOT Access Node (IAN) 201, 301, 405, 505 will typically first register with the IOT Equipment Registry (IER) 204, 306, 410, 511 database and are in turn provided unique and identifiable security cipher keys which are randomly updated by an IOT Equipment Registry (IER) 204, 306, 410, 511 database or an IOT Access Node (IAN) 201, 301, 405, 505 over time. As all devices must typically first be validated by the IOT Equipment Registry (IER) 204, 306, 410, 511 prior to any transaction, their identities and transactions can be captured in a Logging Server 216 at the IOT Equipment Registry (IER) 204, 306, 410, 511 database site for later processing. The Logging Server 216 database may, for example, provide a history of transactions, login attempts, location of activity and precise activity, etc. which might be useful for auditing sensor/device 201, 301, 405, 505 behavior through Artificial Intelligence or Machine Learning.

Although the description has been described with respect to particular embodiments thereof, these particular embodiments are merely illustrative, and not restrictive.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus comprising:
   a. a sensor/device network system for communicating with at least one sensor/device;
   b. the said sensor/device configured to store one or more encryption keys;
   c. an IOT Equipment Registry (IER) database configured to store one or more encryption keys for the said sensor/device;
   d. an IOT Access Node (IAN) configured to permit the said sensor/device access to the said sensor/device network;
   e. the said sensor/device configured to generate a registration message encrypted with an encryption key from the pre-stored list, the said registration message containing at least a manufacturing serialized number;
   f. the said IOT Access Node (IAN) configured to recognize the said message as a registration message;
   g. additionally the said IOT Access Node (IAN) configured to forward said registration message to the said IOT Equipment Registry (IER) database;
   h. the said IOT Equipment Register (IER) database including a decryption unit including a decryption method for the said registration message using said pre-stored encryption keys;
   i. the said IOT Equipment Registry (IER) database including a validation unit to verify the said manufacturing serialized number and the said encryption key;
   j. the said IOT Equipment Registry (IER) database further configured to forward a set of said stored encryption keys for the said sensor/device to the said IOT Access Node (IAN); and
   k. the said IOT Equipment Registry (IER) database configured to return a registration acknowledgement message to the said sensor/device.

2. The communication system of claim 1, wherein the IOT Access Node (IAN) is implemented using a network centric server.

3. The communication system of claim 1 wherein the IOT Equipment Registry (IER) database receives the encryption keys and serialized number data to decipher and check the sensor/device data message from sensor/device manufacturer.

4. The communication system of claim 1 wherein the IOT Access Node (IAN) can decipher data messages from the sensor/device.

5. The IOT Equipment Registry (IER) database of claim 1 wherein the decryption method uses a block cipher standard.

6. The block cipher in claim 5 uses the Simon and Speck standard algorithm.

7. The IOT Access Node (IAN) of claim 1 where the decryption method used the uses a block cipher standard.

8. The block cipher in claim 7 uses the Simon and Speck standard algorithm.

9. A method comprising:
   a. a sensor/device network for communicating with at least one sensor/device having a plurality of IOT Access Nodes (IAN) coupled to an IOT Equipment Registry (IER) database;
   b. the said sensor/device sending a registration message encrypted with a pre-stored list of encryption keys, the said registration message including a manufacturing serialized number;
   c. the said IOT Access Node (IAN) recognizing the said message as the said registration message and forwarding said message to the said coupled IOT Equipment Registry (IER) database;
   d. the said IOT Equipment Registry (IER) database decrypting the said registration message with said one encryption key from the said pre-stored list in the database and reading the said manufacturing serialized number contained in said registration message;

e. the said IOT Equipment Registry (IER) database further validating both the said manufacturing serialized number and the encryption key used to encrypt said registration message;

f. the said IOT Equipment Registry (IER) database forwarding a set of said encryption keys for the said sensor/device to the said IOT Access Node (IAN) to store for use when transmitting and receiving data to the said sensor/device; and g. the said IOT Equipment Registry (IER) database sending a registration acknowledgement to the said sensor/device on successfully validating said registration message.

10. The method in claim 9 further comprising the ability of the sensor/device to be commanded to change parts of any stored encryption key.

11. The method in claim 9 further comprising the ability of the IOT Access Node (IAN) to command the sensor/device to change parts of the encryption key.

12. The method in claim 11 further comprising the ability of the sensor/device to be commanded to change parts of the encryption key randomly.

13. The method in claim 9 further comprising the ability of the sensor/device to randomly select the encryption key to be used for the message data transmission.

14. The sensor/device in claim 9 randomly selecting the encryption key used to encrypt the message data.

15. The IOT Access Node (IAN) in claim 9 determining the encryption key used to encrypt the data by using all the pre-stored encryption keys.

16. The IOT Access Node (IAN) in claim 9 sending the message data to be decrypted to an external server device.

17. The IOT Access Node (IAN) in claim 9 sending the encrypted acknowledgement to the sensor/device within a pre-defined time window.

18. The IOT Equipment Registry (IER) database in claim 9 including the ability to log failed validation attempts to access the sensor/device network.

19. The IOT Equipment Registry (IER) database in claim 18 wherein a validation failure could be caused by the use of the wrong encryption key.

20. The IOT Equipment Registry (IER) database in claim 18 wherein a validation failure could be caused by the use of the wrong sensor/device manufacturing serialized number.

21. The IOT Equipment Registry (IER) database in claim 18 wherein any logged data can be sent to another terminal for processing.

* * * * *